United States Patent
Rose et al.

(10) Patent No.: US 12,324,469 B2
(45) Date of Patent: *Jun. 10, 2025

(54) WETNESS INDICATOR ARTICLE (71) Applicant: NIKE, Inc., Beaverton, OR (US)

(72) Inventors: Payton Rose, Portland, OR (US); Jarrett L. Reynolds, Beaverton, OR (US); Heidi A. Vaughan, Lake Oswego, OR (US)

(73) Assignee: NIKE, Inc., Beaverton, OR (US)

( * ) Notice: Subject to any disclaimer, the term of this patent is extended or adjusted under 35 U.S.C. 154(b) by 364 days.

This patent is subject to a terminal disclaimer.

(21) Appl. No.: 16/156,805

(22) Filed: Oct. 10, 2018

(65) Prior Publication Data
US 2019/0133225 A1    May 9, 2019

Related U.S. Application Data (60) Provisional application No. 62/582,799, filed on Nov. 7, 2017.

(51) Int. Cl.
*A41D 27/00* (2006.01)
*A41D 3/00* (2006.01)
(Continued)

(52) U.S. Cl.
CPC ............... *A41D 27/00* (2013.01); *A41D 3/00* (2013.01); *A42B 1/004* (2013.01); *A42B 1/006* (2013.01);
(Continued)

(58) Field of Classification Search
CPC .......... A41D 27/00; A41D 3/00; A41D 31/12; A41D 3/04; A41D 31/02; A41D 2200/20;
(Continued)

(56) References Cited

U.S. PATENT DOCUMENTS

| | | |
|---|---|---|
| 2,075,945 A | 4/1937 | Hurt |
| 4,231,370 A | 11/1980 | Mroz et al. |

(Continued)

FOREIGN PATENT DOCUMENTS

| | | |
|---|---|---|
| CA | 2849772 C | 11/2014 |
| CN | 1988868 A | 6/2007 |

(Continued)

OTHER PUBLICATIONS

Non-Final Office Action received for U.S. Appl. No. 16/156,574, mailed on Aug. 18, 2020, 11 pages.
(Continued)

*Primary Examiner* — Elizabeth M Imani
(74) *Attorney, Agent, or Firm* — Shook, Hardy & Bacon L.L.P.

(57) ABSTRACT

The technology described herein relates to a three-layer outerwear garment panel comprising an outer layer, a middle membrane layer that is water resistant, and an inner layer. A water-repellant coating such as a durable water-repellant (DWR) coating is selectively applied to the outer layer, leaving areas of the outer layer free from the water-repellant coating. When precipitation hits the garment, the water is absorbed in the non-coated portions to reveal a pattern of shapes formed by the non-coated portions.

15 Claims, 10 Drawing Sheets

(51) Int. Cl.
*A42B 1/004* (2021.01)
*A42B 1/006* (2021.01)
*A45B 25/18* (2006.01)
*A45C 3/00* (2006.01)
*B32B 5/02* (2006.01)
*B32B 5/26* (2006.01)
*D06N 3/00* (2006.01)
*A41D 3/04* (2006.01)
*A41D 31/02* (2019.01)
*A41D 31/12* (2019.01)

(52) U.S. Cl.
CPC .............. *A45B 25/18* (2013.01); *A45C 3/001* (2013.01); *B32B 5/022* (2013.01); *B32B 5/024* (2013.01); *B32B 5/026* (2013.01); *B32B 5/26* (2013.01); *D06N 3/0006* (2013.01); *D06N 3/0036* (2013.01); *A41D 3/04* (2013.01); *A41D 31/02* (2013.01); *A41D 31/12* (2019.02); *A41D 2200/20* (2013.01); *A41D 2500/20* (2013.01); *A41D 2500/54* (2013.01); *B32B 2255/02* (2013.01); *B32B 2307/724* (2013.01); *B32B 2307/726* (2013.01); *B32B 2307/73* (2013.01); *B32B 2437/04* (2013.01); *D06N 2209/126* (2013.01); *D06N 2211/10* (2013.01)

(58) Field of Classification Search
CPC ............ A41D 2500/20; A41D 2500/54; A41D 31/102; A45C 3/001; A42B 1/006; A42B 1/004; B32B 5/022; B32B 5/024; B32B 5/026; B32B 5/26; B32B 2437/04; B32B 2255/02; B32B 2307/726; B32B 2307/73; B32B 2307/724; A45B 25/18
See application file for complete search history.

(56) References Cited

U.S. PATENT DOCUMENTS

| | | | |
|---|---|---|---|
| 4,265,954 A | 5/1981 | Romanek | |
| 5,112,666 A | 5/1992 | Langston | |
| 5,435,010 A | 7/1995 | May | |
| 5,466,515 A | 11/1995 | Blauer et al. | |
| 5,990,377 A | 11/1999 | Chen et al. | |
| 6,235,659 B1 | 5/2001 | McAmish et al. | |
| 6,572,575 B1 | 6/2003 | Shimada et al. | |
| 6,774,065 B2 | 8/2004 | Haruta et al. | |
| 7,056,570 B2 | 6/2006 | Nakashima et al. | |
| 7,344,619 B2 | 3/2008 | Helmeke | |
| 7,682,994 B2 | 3/2010 | Van Emden et al. | |
| 7,754,626 B2 | 7/2010 | Baron et al. | |
| 8,176,569 B2 | 5/2012 | Rock et al. | |
| 8,806,663 B2 | 8/2014 | White et al. | |
| 8,845,230 B2 | 9/2014 | Drago | |
| 8,906,275 B2 | 12/2014 | Davis et al. | |
| 8,946,100 B2 | 2/2015 | Dutkiewicz et al. | |
| 9,006,117 B2 | 4/2015 | Johnson et al. | |
| 9,017,505 B2 | 4/2015 | Gallagher | |
| 2004/0117923 A1* | 6/2004 | Taylor ................. | D06M 13/425 8/518 |
| 2004/0237164 A1 | 12/2004 | Aperfine et al. | |
| 2005/0101209 A1 | 5/2005 | Li et al. | |
| 2006/0020249 A1* | 1/2006 | Allen ..................... | A61F 13/42 604/361 |
| 2006/0143772 A1 | 7/2006 | Feduzi et al. | |
| 2006/0160453 A1 | 7/2006 | Suh | |
| 2006/0179539 A1 | 8/2006 | Harber | |
| 2007/0022510 A1 | 2/2007 | Chapuis et al. | |
| 2009/0276936 A1 | 11/2009 | Makida et al. | |
| 2010/0199406 A1 | 8/2010 | Dua et al. | |
| 2010/0262099 A1* | 10/2010 | Klofta ................. | A61F 13/5323 604/361 |
| 2012/0122361 A1 | 5/2012 | Hand et al. | |
| 2012/0317694 A1 | 12/2012 | Block et al. | |
| 2014/0082815 A1 | 3/2014 | Harber et al. | |
| 2015/0237948 A1 | 8/2015 | Mallen et al. | |
| 2015/0296890 A1 | 10/2015 | Moloney | |
| 2016/0075101 A1 | 3/2016 | Blackford et al. | |
| 2016/0331055 A1 | 11/2016 | Pezzimenti | |
| 2016/0338435 A1 | 11/2016 | Aihara | |
| 2017/0035128 A1 | 2/2017 | Baron et al. | |
| 2017/0058451 A1 | 3/2017 | Smith et al. | |
| 2019/0234013 A1* | 8/2019 | Xing ........................ | B32B 5/02 |

FOREIGN PATENT DOCUMENTS

| | | | |
|---|---|---|---|
| CN | 201323880 Y | 10/2009 | |
| CN | 201409492 Y | 2/2010 | |
| CN | 201509671 U | 6/2010 | |
| CN | 202552205 U | 11/2012 | |
| CN | 202618596 A | 12/2012 | |
| CN | 103628646 A | 3/2014 | |
| CN | 203851838 U | 10/2014 | |
| CN | 104664857 A | 6/2015 | |
| CN | 204426766 U | 7/2015 | |
| CN | 204861260 U | 12/2015 | |
| CN | 205006147 U | 2/2016 | |
| EP | 1254985 B1 | 2/2007 | |
| JP | H02104782 A | 4/1990 | |
| JP | 3195763 B2 | 8/2001 | |
| JP | 2004293016 A | 10/2004 | |
| JP | 2006-207052 A | 8/2006 | |
| JP | 2007-154063 A | 6/2007 | |
| JP | 2008-214793 A | 9/2008 | |
| JP | 2011-122278 A | 6/2011 | |
| WO | 2006100279 A1 | 9/2006 | |
| WO | 2014/205104 A1 | 12/2014 | |

OTHER PUBLICATIONS

"10X® Lock Down Pant with Scentrex®", Walls, Outdoor Goods, Available online at: <http://www.walls.com/new-arrivals/10x-lock-down-pant-with-scentrex/ZP714.html>, Accessed on Apr. 1, 2017, 4 pages.

"DWR—Durable Water Repellent", NOMAD, Available online at: <http://nomadoutdoor.com/collections/dwr>, Accessed on Apr. 1, 2017, 2 pages.

International Preliminary Report on Patentability received for PCT Patent Application No. PCT/US2018/056456, mailed on Apr. 30, 2020, 8 pages.

International Preliminary Report on Patentability received for PCT Patent Application No. PCT/US2018/059562, mailed on May 22, 2020, 9 pages.

International Search Report and Written Opinion mailed Feb. 13, 2019 in International Patent Application No. PCT/US2018/059562, 16 pages.

Martines, Elena, et al. "Superhydrophobicity and superhydrophilicity of regular nanopatterns." Nano letters 5.10 (2005): 2097-2103. http://eprints.soton.ac.uk/263182/1/nl051435t.pdf.

Lomax, G. R. "The design of waterproof, water vapour-permeable fabrics." Journal of Coated Fabrics 15.1 (1985): 40-66. http://journals.sagepub.com/doi/abs/10.1177/152808378501500105.

Bixler, Gregory D. "Bioinspired Surface for Low Drag, Self-Cleaning, and Antifouling: Shark Skin, Butterfly and Rice Leaf Effects." Dissertation Presented in Partial Fulfillment of the Requirements for the Degree Doctor of Philosophy in the Graduate School of The Ohio State University: Mechanical Engineering (2013). https://nlbb.engineering.osu.edu/sites/nlbb.osu.edu/files/uploads/bixler_phd_thesis.pdf.

Xing, Siyuan, Jia Jiang, and Tingrui Pan. "Interfacial microfluidic transport on micropatterned superhydrophobic textile." Lab on a Chip 13.10 (2013): 1937-1947. https://www.ncbi.nlm.nih.gov/pubmed/23536189.

Koch, Kerstin, and Wilhelm Barthlott. "Superhydrophobic and superhydrophilic plant surfaces: an inspiration for biomimetic materials." Philosophical Transactions of the Royal Society of London A: Mathematical, Physical and Engineering Sciences 367.1893 (2009): 1487-1509. http://rsta.royalsocietypublishing.org/content/367/1893/1487.

(56) References Cited

OTHER PUBLICATIONS

Notice of Allowance received for U.S. Appl. No. 16/156,574, mailed on Dec. 30, 2020, 10 pages.
Office Action received for European Patent Application No. 18797429.0, mailed on Apr. 26, 2021, 4 pages.
Office Action received for European Patent Application No. 18807818.2, mailed on May 9, 2022, 5 pages.
Summons to Attend Oral Proceedings Office action received for European Patent Application No. 18797429.0, mailed on Aug. 9, 2022, 5 pages.
Intention to Grant received for European Patent Application No. 18797429.0, mailed on Nov. 30, 2022, 6 pages.
Office Action received for European Patent Application No. 18797429.0, mailed on Nov. 19, 2021, 4 pages.

\* cited by examiner

WETNESS INDICATOR ARTICLE

CROSS-REFERENCE TO RELATED APPLICATIONS

This U.S. Non-Provisional Application No. 16/156,805, filed Oct. 9, 2018, and entitled "Wetness Indicator Article" claims the benefit of priority to U.S. Provisional Application No. 62/573,863, filed on Nov. 7, 2017, and entitled "Wetness Indicator Article." The entirety of the aforementioned application is incorporated by reference herein.

STATEMENT REGARDING FEDERALLY SPONSORED RESEARCH OR DEVELOPMENT

Not applicable.

TECHNICAL FIELD

Aspects of the technology described herein relate to an indicator fabric that is configured to protect from wetness and to signal a level of wetness of the fabric in response to moisture levels in the environment, and garments and articles formed from the indicator fabric.

BACKGROUND

A user or those around him or her may not always be aware of the amount of moisture present in, for example, the air, in the form of rain, mist, fog, dew, and the like. This may be especially true when rain is localized in some areas of a neighborhood or city. Or, in the situation where the user goes into a building where the people inside may not be aware of the wet conditions outside unless they actively pursue such information via media channels and/or conversations with others.

BRIEF DESCRIPTION OF THE SEVERAL VIEWS OF THE DRAWING

The technology described herein is described in detail below with reference to the attached drawing figures, wherein.

DETAILED DESCRIPTION

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

This technology is generally directed to a wetness indicator panel and more specifically, an article comprised of the wetness indicator panel. In one exemplary aspect, the wetness indicator panel may comprise of one or more layers of material including a top most layer. The exposed surface of the top most layer may be selectively coated with a water-repellant coating material such as, for example, a durable water-repellant coating (e.g., a DWR coating) to form portions that are coated with the durable water-repellant coating and second portions that are not coated with the durable water-repellant coating.

In another exemplary aspect, the wetness indicator panel may comprise a single layer. A first surface of the single layer may be completely (i.e., continuously) coated with a water-repellant/water-impermeable coating material (non-porous coating material) and the second opposite surface of the single layer may comprise portions coated with a water-repellant coating material and portions not coated with the water-repellant coating material. The water-repellant coating material coating the portions on the second surface may be comprised of materials such as DWR and, the water-repellant coating material used for coating the first surface may be any suitable non-porous coating material to make the wetness indicator panel water impermeable such as, for example, a silicone coating material, a polyurethane coating material, thermoplastic polyurethane coating material, and the like, depending on the end use of the wetness indicator panel. Since the water-repellant coating material on the first surface may have some adverse effects on the breathability of the of the wetness indicator panel when it is coated on both sides, the single layer of the wetness indicator panel in accordance with aspects herein may be used to form articles such as umbrellas, tent covers, car covers, boat covers, bike covers, bags (i.e., backpacks, purses, duffel bags, sacks, luggage, equipment bags, etc.) and the like where breathability of the wetness indicator panel is not as important as its water impermeable function for protecting and signaling wetness to the user.

With respect to both of these aspects (single layer or multi-layer), the portions that are not coated with the water-repellant coating material may form a pattern of non-coated discrete shapes that, as described above, become visible only when the non-coated discrete shapes come into contact with moisture. The discrete shapes may include any shapes such as, for example, geometric shapes, logos, symbols, organic shapes, hearts, stars, alphanumeric characters, or a combination of these. In other words, the non-coated discrete shapes may take on any desired shape in accordance with aspects herein.

In the case where desirable properties of the wetness indicator panel include breathability and water resistance, the wetness indicator panel may comprise a layered construction, with a first layer comprised of a woven, stretch woven, or knit textile/fabric material, a second layer comprised of a breathable and water resistant polymer membrane, and optionally, a third layer comprised of a mesh or tricot knit fabric or textile material. Each of the first layer, the second layer, and the third layer comprises a front/first surface and a back/second surface. The two, or optionally three layers, may be affixed or heat bonded to each other by a lamination process, where the front surface of the second layer is laminated to the back surface of the first layer and if provided, the front surface of the third layer is laminated to the back surface of the second layer. The front surface of the first layer may, in accordance with aspects herein, comprise a water-repellant coating material applied to a first plurality of portions to form coated portions, and not applied to a second plurality of portions to form non-coated portions.

The non-coated portions on the front surface of the first layer, as briefly described above, will absorb moisture and therefore, become wet, while the coated portions will repel moisture because of the water-repellant coating material. The second layer thus prevents or reduces the chances of moisture from the non-coated portions from soaking through the wetness indicator panel thereby protecting the wearer. Further, with the layered construction, the breathability of the wetness indicator panel may be enhanced when compared to garments or panels completely covered with a water-repellant coating material. This is because the wetness indicator panel remains breathable through at least the non-coated portions, and the second layer is a breathable membrane that maintains the water resistance of the wetness indicator panel even in the non-coated portions.

In one example, the total surface area on the front surface of the first layer that is occupied by the coated portions may be greater than the total surface area on the front surface of the first layer that is occupied by the non-coated portions. In other aspects, the total surface area on the front surface of the first layer that is occupied by the coated portions may the same as the total surface area on the front surface of the first layer that is occupied by the non-coated portions. Or in yet other aspects, the total surface area of the front surface of the first layer that is occupied by the coated portions may be less than the total surface area on the front surface of the first layer that is occupied by the non-coated portions.

The non-coated portions may each comprise a discrete shape that is surrounded or circumscribed by one or more coated portions, where the one or more coated portions may be interconnected with each other. The discrete shape of each of the non-coated portions may comprise a particular shape such as a logo, a geometric shape, a star, a heart, an irregular shape, alphanumeric characters, organic shapes, emoji shapes, punctuation characters, and the like. In one aspect, the wetness indicator panel may comprise a uniform shape for all non-coated portions. In another aspect, the wetness indicator panel may comprise a combination of shapes. For example, a combination of alphanumeric and punctuation characters may be used to form a hidden message that will only become visible in the presence of moisture, or other combination of shapes may be used to create special effects on the wetness indicator panel.

Further aspects in accordance with aspects herein are directed to a method of manufacturing the wetness indicator panel, and a method of manufacturing garments and articles that use the wetness indicator panel in accordance with aspects herein. The method of making a wetness indicator panel in a first aspect may include providing a woven fabric or textile panel having a first surface and an opposite second surface. The method further comprises providing a coating of a water-repellant coating material (e.g. DWR) to one of the first surface or the second surface at a first plurality of portions to form a plurality of coated portions and simultaneously, not providing the coating of the water-repellant coating material to the first surface or the second surface at a second plurality of portions to form a plurality of non-coated portions. The method additionally comprises, providing a coating of the water-repellant/water-impermeable coating material (e.g. DWR, silicone, polyurethane, thermoplastic polyurethane, and the like) to the entire opposite first surface or second surface of the woven fabric or textile panel. The water-repellant or the water-impermeable coating material may be applied via any suitable process such as, for example, a roller printing process, spraying, screen printing, and the like. For instance, for the application of the water-repellant to the first surface where the water-repellant material is only applied to a first plurality of portions of the first surface, a roller printing process may be used where the roller may comprise a plurality of recessed areas corresponding to the plurality of non-coated portions to form a desired pattern of non-coated portions on the wetness indicator panel. However, for the second surface, where the water-repellant or the water-impermeable coating material may be continuously applied to the entire second surface of the wetness indicator panel, methods such as spraying or roller printing with a smooth roller (i.e., having no recessed areas) may be used for applying the water-repellant or water-resistant coating. Other methods may also include screen printing, and the like.

In a second aspect, the method of making a wetness indicator panel may include providing a composite panel of material comprising at least a woven or knit fabric layer that may be comprised of, for example, polyester, and a water resistant membrane layer that may be comprised of, for example, a polymer material such as polyurethane. The water resistant membrane may in some aspects be hydrophobic or in some other aspects it may be hydrophilic. Thus, the composite panel of material comprises the woven or knit fabric layer on one surface (i.e., first/front surface) and the water resistant membrane layer on the opposite surface. Alternatively, a composite panel of material comprising at least a woven or knit fabric layer, a water resistant and breathable membrane layer, and a tricot knit or a mesh type material layer that may be comprised of, for example, nylon, may be provided, where the water resistant and breathable membrane layer is positioned between the woven or knit fabric layer and the tricot knit or mesh type material layer. Thus, the composite panel of material comprises the woven or knit fabric layer on one surface (i.e., first/front surface), the tricot knit or mesh material layer on the opposite surface (i.e., second/back surface), and the breathable membrane positioned between the woven or knit fabric layer and the tricot knit or mesh material layer. The method may further include providing a coating of a water-repellant coating material (e.g., DWR) to a first plurality of portions on the first surface of the composite panel of material (i.e., exposed surface of the woven or knit fabric layer) to form a plurality of coated portions and simultaneously, not providing the coating of the water-repellant coating material to a second plurality of portions on the first surface of the composite panel of material to form a plurality of non-coated portions. The result of this step is the formation of the wetness indicator panel with a plurality of coated portions with the water-repellant coating material and a plurality of non-coated portions. The wetness indicator panel may then be used to form the wetness indicator garments or articles in accordance with aspects herein.

In addition to providing the water-repellant coating material, other treatments such as flocking, peaching, or the like may also be provided to one or more portions of the front surface of the first layer of material (i.e., woven or knit fabric layer) in order to provide a soft feel and in order to increase the effective thickness of the first layer to prevent or reduce the chances of wetting out by keeping moisture off of the front surface of the first layer, or in other words, preventing or reducing the chance of the moisture from directly contacting the front surface of the first layer. In another example, the thickness of the first layer may be increased to further prevent or reduce the chances of moisture or water from saturating the first layer of material. For example, when several samples of the wetness indicator panel comprising peaching on their technical face, in accordance with aspects herein, were tested for water resistance, the results showed negligible absorption of water even after several washing and drying cycles. As such, the wetness indicator panels in accordance with aspects herein, offer a visual indication of moisture in the environment while at the same time, effectively protecting a wearer (when employed in a garment) or an article (when employed as a cover or when used for manufacturing the article itself.)

Further, aspects herein are also directed to methods of manufacturing garment or article panels from the wetness indicator fabrics or textiles in accordance with aspects herein. As described above, the pattern formed by the water-repellant material coated portions and the non-coated portions is not visible when the fabric or textile is dry. As such, a guide may be provided when the pattern is required to have a particular orientation in the end product, so that the garment or article panels may be cut to shape with the right orientation of the pattern. The guide may be comprised of a removable or washable set of visible markings provided on the wetness indicator fabric or textile in accordance with aspects herein. The markings may be, for example, printed or stamped onto the technical face (i.e., exterior/exposed surface face on the final garment or article) of the wetness indicator fabric or textile, in accordance with aspects herein, where the coated and non-coated portions with the water-repellant coating material are provided. Alternatively, the markings may be provided on the surface that is opposite to the technical face. The markings may, for example, consist of a grid, a set of lines, a set of alphanumeric characters, and the like, suitable for indicating the particular orientation of the pattern on the technical face. In other aspects, the markings may be provided using washable "invisible ink," that is, ink that is only visible under special lighting conditions, or ink that may only be visible to a computerized cutting device, for example. The markings may be applied to the wetness indicator fabric or textile material prior to providing the water-repellant coating material pattern on the fabric or textile's technical face, or it may be applied after the water-repellant coating material pattern is provided to the fabric or textile's technical face.

Figure 1:
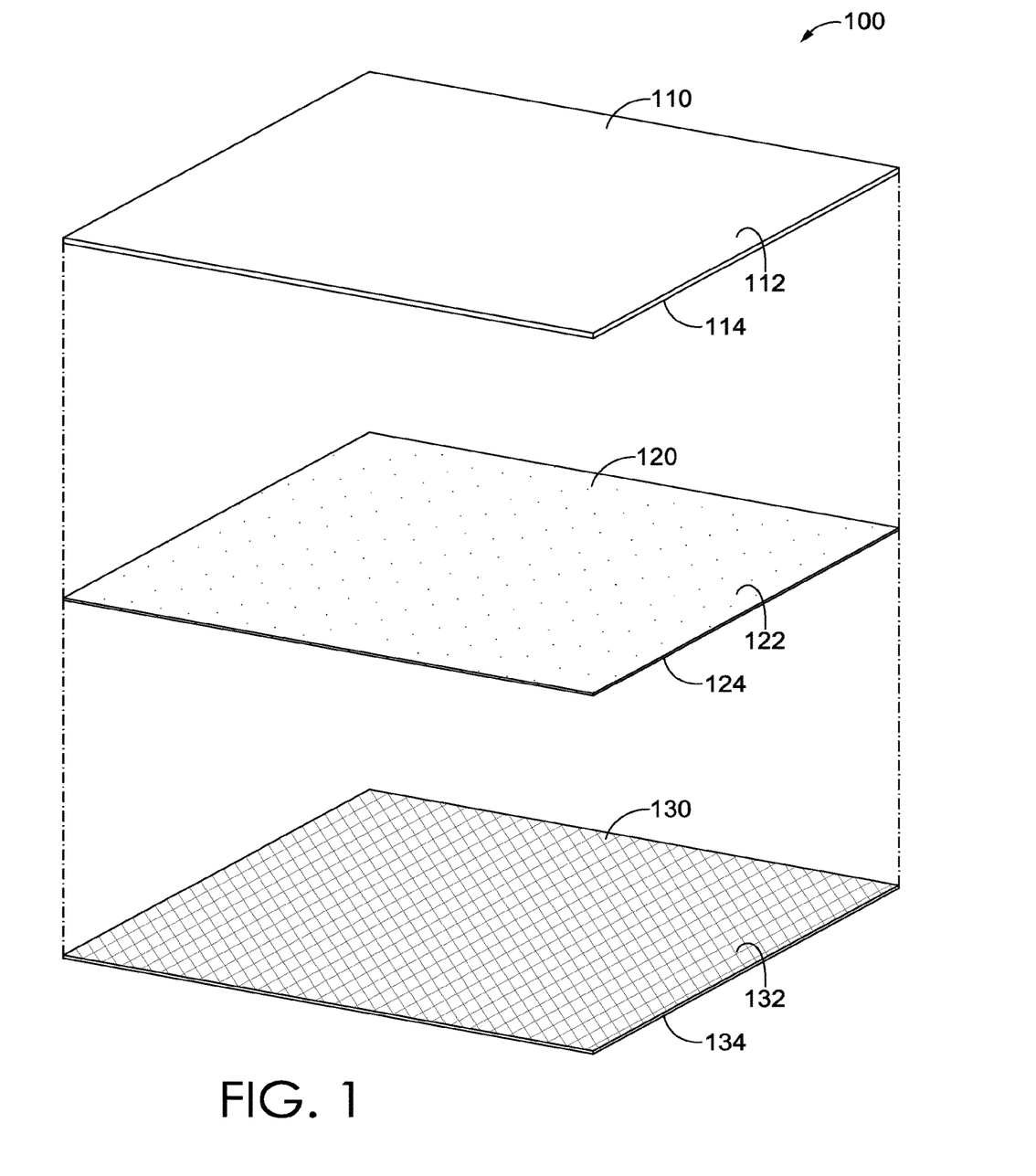
FIG. 1 depicts a deconstructed wetness indicator panel in accordance with aspects herein.

Moving on to the figures, FIG. 1 depicts a deconstructed view of an exemplary wetness indicator panel 100 in accordance with aspects herein. The wetness indicator panel 100, as depicted, may comprise a first layer 110 having a first surface 112 and an opposite second surface 114, a second layer 120 having a third surface 122 and an opposite fourth surface 124, and a third layer 130 having a fifth surface 132 and an opposite sixth surface 134. The first layer 110 may be comprised of a woven, a stretch woven, or a knit fabric or textile. The second layer 120 may be comprised of a breathable non-woven polymer membrane that comprises water resistant properties. The third layer 130 is an optional layer that may be comprised of a mesh type material or a tricot knit material that is breathable and provides a smooth comfortable feel to touch. Thus, the third layer 130 may provide protection to the second layer 120 and may add a comfort feel to the wetness indicator panel 100, especially when the wetness indicator panel 100 is used in a garment or an article of apparel that may position the wetness indicator panel 100 to be in contact with or in close proximity to the wearer's skin. In other words, the sixth surface 160 of the third layer 130 of the wetness indicator panel 100 may be configured to be the layer or surface in contact with or in close proximity to the wearer's skin, when the article of apparel comprising a wetness indicator panel, such as wetness indicator panel 100, is worn by the wearer. Alternatively, the articles of apparel may comprise a lining layer in which case, the third layer 130 may or may not need to be provided.

Figure 2:
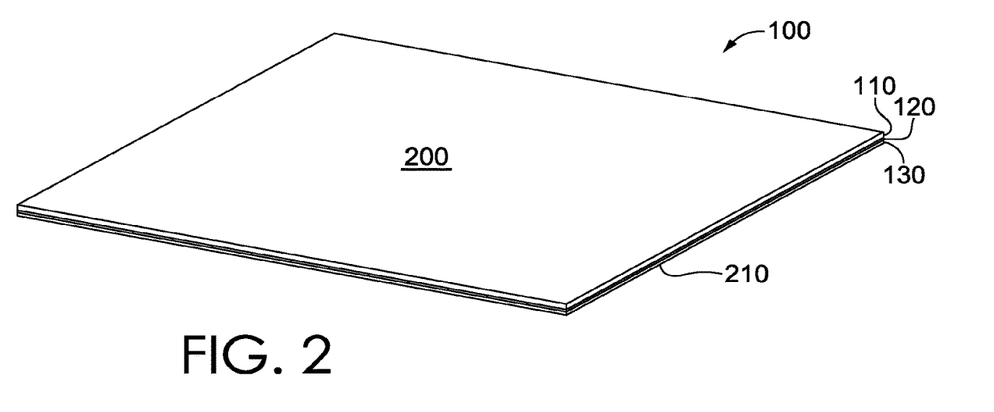
FIG. 2 depicts a wetness indicator panel under dry conditions in accordance with aspects herein.

As shown in FIG. 2, The first layer 110, the second layer 120, and the third layer 130 of wetness indicator panel 100 may be affixed or heat bonded to each other by a lamination process in which the second surface 114 of the first layer 110 is affixed to the third surface 122 of the second layer 120, and the fourth surface 124 of the second layer 120 is affixed to the fifth surface 132 of the third layer 130. As such, if only the first layer 110 and the second layer 120 are provided, the wetness indicator panel 100 will have the first surface 112 of the first layer 110 as a front surface 200 and the fourth surface 124 of the second layer 120 as a back surface 210. If the first layer 110, the second layer 120, and the third layer 130 are provided, the wetness indicator panel 100 will have the first surface 112 of the first layer 110 as an exposed front surface 200 and the sixth surface 134 of the third layer 130 as an exposed back surface 210. An exemplary composite fabric or textile material that may be suitable for use in accordance with aspects herein is a composite material assembly available from Hyperbola Textile Co., Ltd.

It is common knowledge in the art that the front surface of a garment panel or article panel is the one that is exposed and visible, while the back surface of the garment panel or article panel is the one that is hidden, or faces the interior of the garment or article constructed with the garment panel or article panel. As such, in accordance with aspects herein, the front surface 200 of the wetness indicator panel 100 (first surface 112 of the first layer 110) is provided with a water-repellant coating material in a first plurality of portions and simultaneously, not provided with the water-repellant coating material in a second plurality of portions. The water-repellant coating material in the first plurality of portions prevents or reduces the chances of the front surface 200 of the wetness indicator panel 100 from absorbing moisture in the first plurality of portions. However, the second plurality of portions that are not coated with the water-repellant coating material do absorb moisture and thereby undergo a color change, becoming darker or deeper in color when compared to the first plurality of portions of the wetness indicator panel 100 that comprise the water-repellant coating. As such, a pattern formed by the second plurality of portions that are not coated with the water-repellant coating material becomes visible on the front surface 200 of the wetness indicator panel 100. However, once the moisture evaporates from the non-coated portions, the wetness indicator panel 100 dries out and the pattern of shapes formed by the second plurality portions becomes invisible again. Thus, each portion in the second plurality of portions that is not coated with the water-repellant coating material may be made to comprise a discrete shape in order to create the pattern, which in addition to indicating wet conditions to those looking at the wetness indicator panel 100, may be used to communicate a message, or be visually appealing, as will become more apparent with reference to FIGS. 3A and 3B.

Figure 3A:
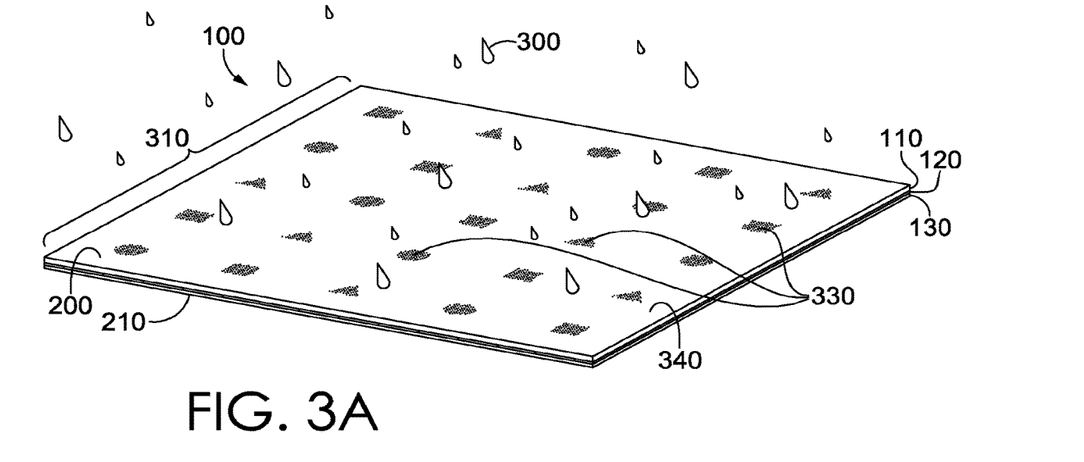
FIG. 3A depicts an exemplary pattern of shapes revealed under wet conditions on the wetness indicator panel in FIG. 2 in accordance with aspects herein.
Figure 3B:
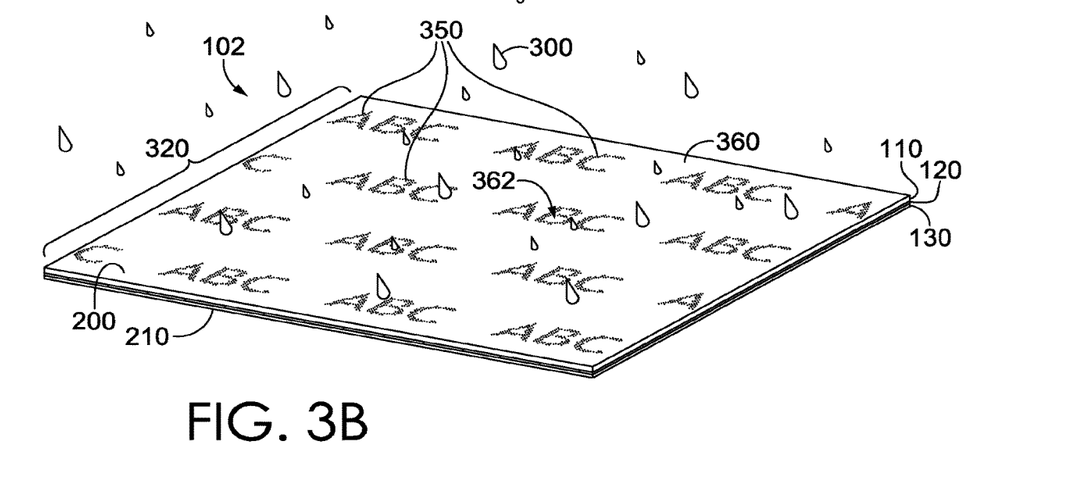
FIG. 3B depicts another exemplary pattern of shapes revealed under wet conditions on a wetness indicator panel in accordance with aspects herein.

As can be observed from FIGS. 3A and 3B, when the wetness indicator panel 100 is exposed to moisture 300, the portions of the front surface 200 that are not coated with the water-repellant coating material become visible as the moisture 300 becomes absorbed by the non-coated portions of the first layer 110, and the non-coated portions become darkened.

FIG. 3A shows the wetness indicator panel 100 revealing a pattern of shapes 310 on the front surface 200, formed by a plurality of non-coated portions 330. As shown, each non-coated portion 330 has a specific shape, which in FIG. 3A is shown to be a geometric shape. It is to be noted that the geometric shapes of the non-coated portions 330 making the pattern of shapes 310 and their shown arrangement are only exemplary. Any shapes and any arrangement of shapes are possible and still within the scope of the aspects described herein. For example, other shapes may include stars, hearts, organic shapes, irregular shapes, other geometric shapes, logos, alphanumeric characters, punctuation characters, and the like. The shapes in the pattern of shapes 310 may be arranged in a regular pattern (as shown), an irregular pattern, forming a logo, displaying a message, forming a larger shape, by for example, the pattern of shapes 310 being positioned inside of a larger shape such as a letter, a logo, and the like.

As further shown, in FIG. 3A, each non-coated portion 330 may be discrete or separate from other non-coated portions 330. Each non-coated portion 330 may be separated from another non-coated portion 330 by coated portions 340, where the coated portions 340, unlike the non-coated portions 330, may be interconnected with each other. In other words, each non-coated portion 330 may be completely surrounded or circumscribed by one or more coated portions 340. To describe in yet another way, in exemplary aspects, instead of comprising separate discrete shapes or portions, the coated portions 340 may be interconnected such that they form a continuous portion or shape or path on the wetness indicator panel 100.

Another exemplary aspect is shown in FIG. 3B, which illustrates a wetness indicator panel 102 having non-coated portions 350 in the form of alphanumeric characters that are circumscribed or defined by coated portions 360. In this aspect, one or more coated portions 360, such as coated portion 362, may be circumscribed by one or more of the non-coated portions 350. As further shown in FIG. 3B, since the plurality of non-coated portions 350 may have alphanumeric character shapes, the plurality of non-coated portions 350 may be arranged in any desired pattern of shapes 320 useful for, for example, conveying a message, displaying a logo, and the like. The wetness indicator panel 102 may have the same or similar appearance as the wetness indicator panel 100, when it is dry and not exposed to moisture 300, as shown in FIG. 2.

Figure 4:
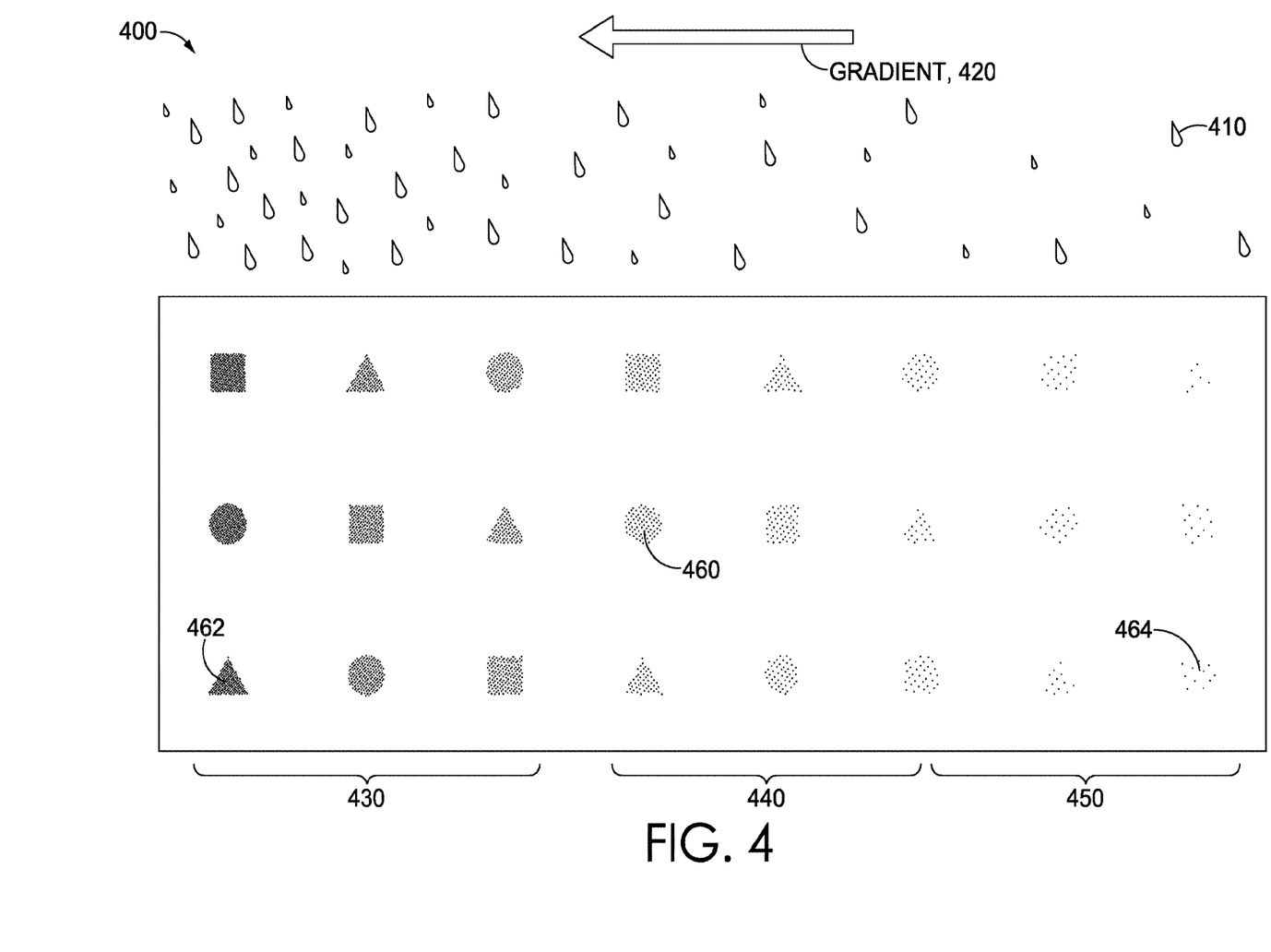
FIG. 4 depicts how different levels of wetness may affect the color intensity of the pattern of shapes in accordance with aspects herein.

FIG. 4 depicts how different amounts of moisture 410 absorbed in a plurality of non-coated portions 460 of wetness indicator panel 400 may have an effect on the appearance of the non-coated portions 460 in terms of the color intensity/darkening of the non-coated portions 460. For example, in FIG. 4, gradient 420 shows how greater amounts of moisture 410 result in greater saturation of the non-coated portions 460, leading to the greater darkening effect, such as shown in non-coated portion 462 in section 430. With decreased amounts of moisture 410, the effects on the color darkening of the wetness indicator panel 400 may be less intense, as shown in section 440 of the wetness indicator panel 400. Finally, with minimal amounts of exposure to moisture, the color change of the non-coated portions 460 may be minimal, as shown by non-coated portion 464 in section 450 of the wetness indicator panel 400.

Continuing, it is to be noted that although FIG. 4 is depicted as a function of an amount or level of moisture 410 that the wetness indicator panel 400 may be exposed to in a given time period, even if the amount of moisture is low but the exposure time is prolonged, the non-coated portions 460 may still become saturated and eventually exhibit the maximum color darkening effect (e.g., as in non-coated portion 462.) Additionally, a color change may also be observed when the wetness indicator panel 400 is allowed to dry. In other words, as the moisture 410 is slowly released back into the environment (via, for example, evaporation), the non-coated portions 460 will become gradually less visible until the non-coated portions 460 become nearly or completely dry, at which point they will no longer be visible. Depending on the fabric or textile material composition of the wetness indicator panel 400, on the color of the wetness indicator panel 400, and on the color intensity of the wetness indicator panel 400, the threshold visibility of the non-coated portions 460 may be different. For example, since moisture tends to evaporate at a slower rate from cotton when compared to polyester, the visibility of the non-coated portions 460 may be less intense and/or shorter lived in polyester fabrics or textiles when compared to cotton fabrics or textiles.

Figure 5A:
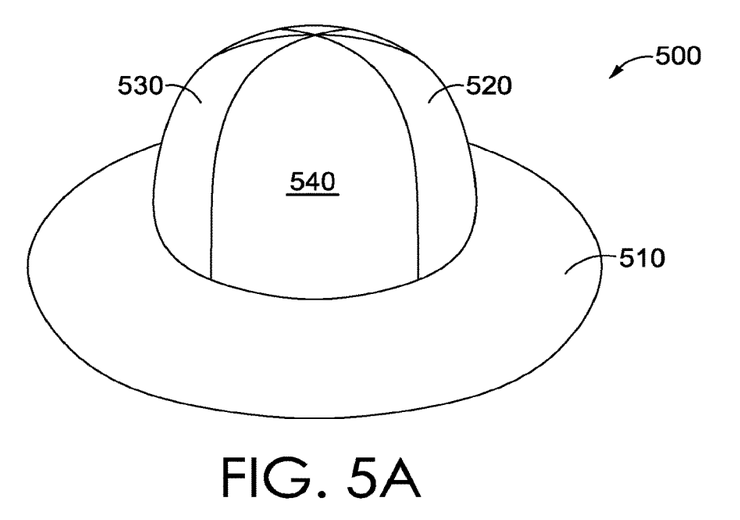
FIG. 5A depicts a hat comprising one or more wetness indicator panels under dry conditions in accordance with aspects herein.
Figure 5B:
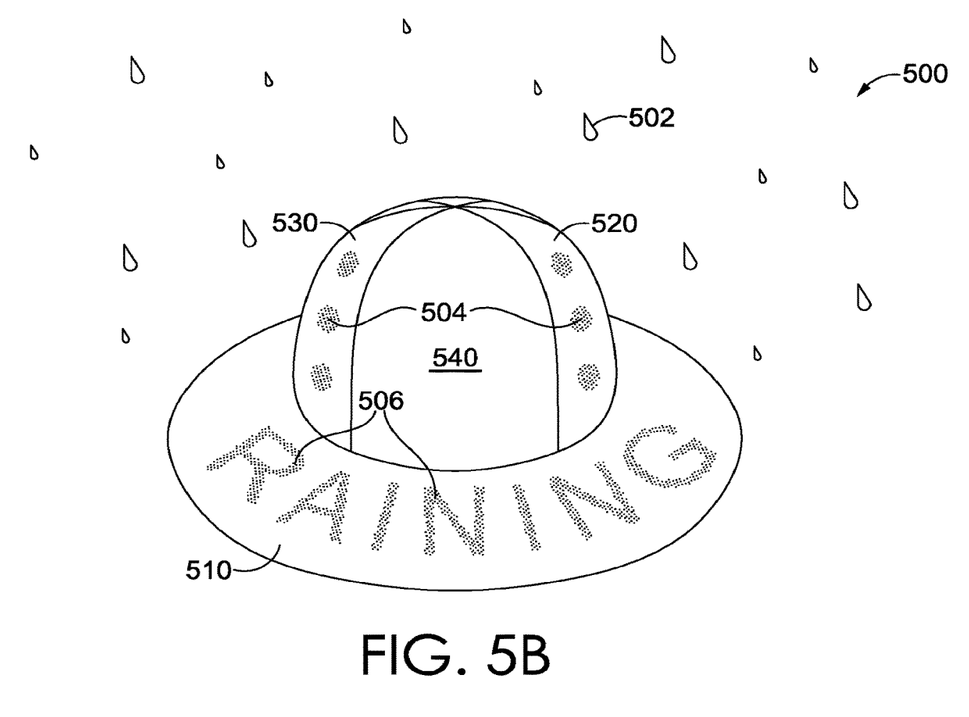
FIG. 5B depicts the hat in FIG. 5A under wet conditions in accordance with aspects herein.

FIGS. 5A and 5B depict an exemplary article 500 under dry conditions and under wet conditions, respectively. As shown in FIG. 5A, the article 500 may be a hat (as shown), a shoe, an umbrella, a bag, and the like. The article 500 may comprise one or more wetness indicator panels such as, for example, panels 510, 520, and 530, and one or more non-indicator panels such as, for example, panel 540. The non-indicator panels (e.g., panel 540) may comprise a full coating of the water-repellant coating material (i.e., no non-coated portions) on the outer facing surface. Further, as shown in FIG. 5B, different wetness indicator panels may comprise different patterns formed by a plurality of non-coated portions 504 and 506, as revealed in the presence of moisture 502. For example, panels 520 and 530 may reveal a first pattern formed by non-coated portions 504 and panel 510 may reveal a second pattern formed by non-coated portions 506. As briefly described above, and as shown in FIG. 5B, the pattern of non-coated portions 504 and 506 may include a random pattern of specific shapes or random shapes, a specific pattern of random shapes or specific shapes, or as shown in FIG. 5B, may be used to reveal a message such as the word "RAINING" that is revealed by the non-coated portions 506. Since breathability of the article 500 may be desirable, the wetness indicator panels 510, 520, and 530 may be formed using the composite construction described earlier with respect to, for example, FIG. 1. However, if breathability is not a concern, such as in the case of an umbrella 600, as shown in FIGS. 6A and 6B, a one layer construction of the wetness indicator panel may be more desirable as explained below.

Figure 6A:
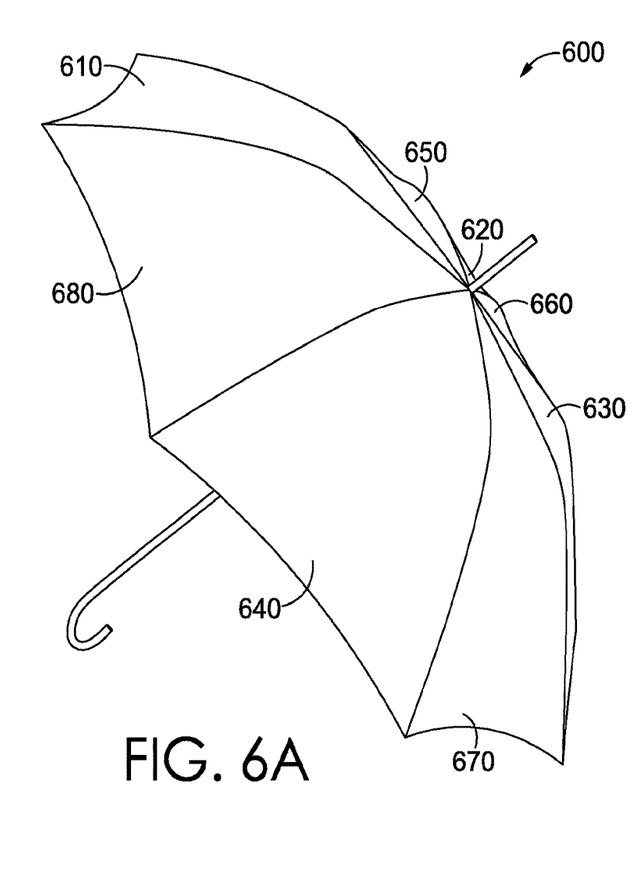
FIG. 6A depicts a garment comprising one or more wetness indicator panels under dry conditions in accordance with aspects herein.
Figure 6B:
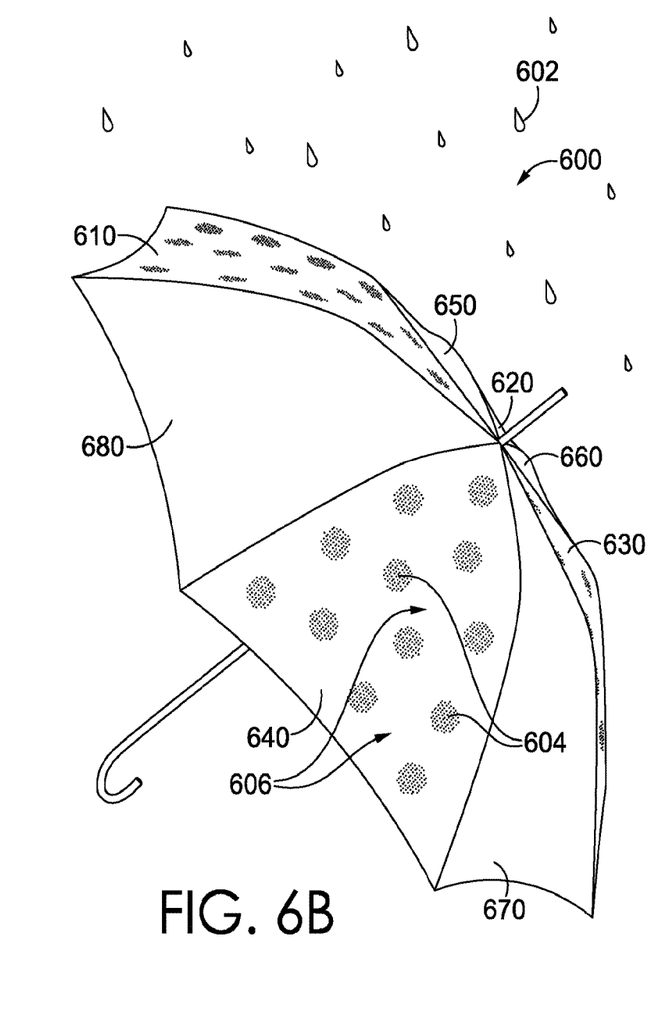
FIG. 6B depicts the garment in FIG. 6A under wet conditions in accordance with aspects herein.

As shown in FIGS. 6A and 6B, the umbrella 600 may comprise one or more wetness indicator panels such as, panels 610, 620, 630, and 640, and one or more non-indicator panels such as, panels 650, 660, 670, and 680. Alternatively, all panels 610-680 may be comprised of wetness indicator panels. Since the article is an umbrella 600, where breathability is not a big concern, but rather, weight and water resistance and/or water impermeability are of a greater concern, the different panels used to construct the umbrella 600 may be comprised of only a single layer of material. The non-wetness indicator panels such as 650, 660, 670, and 680, may comprise a continuous water-repellant coating on both surfaces of the non-wetness indicator panels. The wetness indicator panels such as 610, 620, 630, and 640 may comprise a continuous water-repellant coating on one surface and on the opposite surface, the wetness indicator panels 610, 620, 630, and 640 may comprise a plurality of water-repellant coated portions 606 and a plurality of non-coated portions 604 where the plurality of non-coated portions 604 may comprise specific shapes. Then, when the umbrella 600 is being constructed, the surface with the continuous water-repellant may be placed internally where it is not externally visible and where it is not in direct contact with the moisture 602, while the surface with the plurality of coated portions 606 and the plurality of non-coated portions 604 may be placed externally where the plurality of non-coated portions 604 will become visible when they come in contact with the moisture 602. As shown in FIG. 6B, a pattern formed by the plurality of non-coated portions 604 becomes revealed in the wetness indicator panels 610, 620, 630, and 640 in the presence of moisture 602. And as shown in FIG. 6A, when the wetness indicator panels 610, 620, 630, and 640 are under dry conditions, the pattern formed by the plurality of non-coated portions 604 is invisible, or not easily detected, especially from a distance away from the umbrella 600. The advantage of this construction is that any moisture 602 that permeates through the non-coated portions 604 will be prevented from passing through the panels 610, 620, 630, and 640 by the continuous application of the water-repellant coating on the internal-facing surface thus maintaining the functionality of the umbrella 600.

Figure 7A:
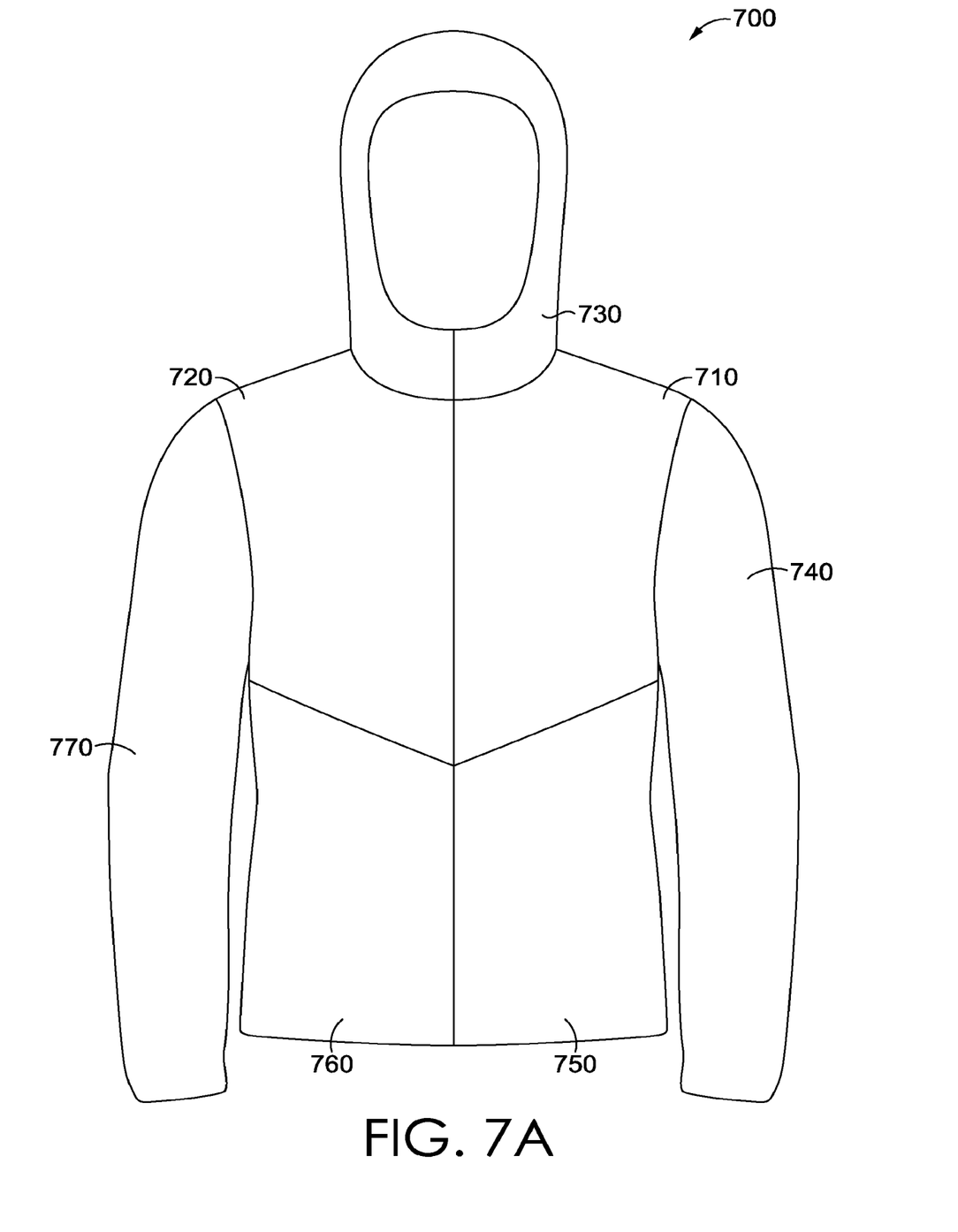
FIG. 7A depicts an article comprising one or more wetness indicator panels under dry conditions in accordance with aspects herein.
Figure 7B:
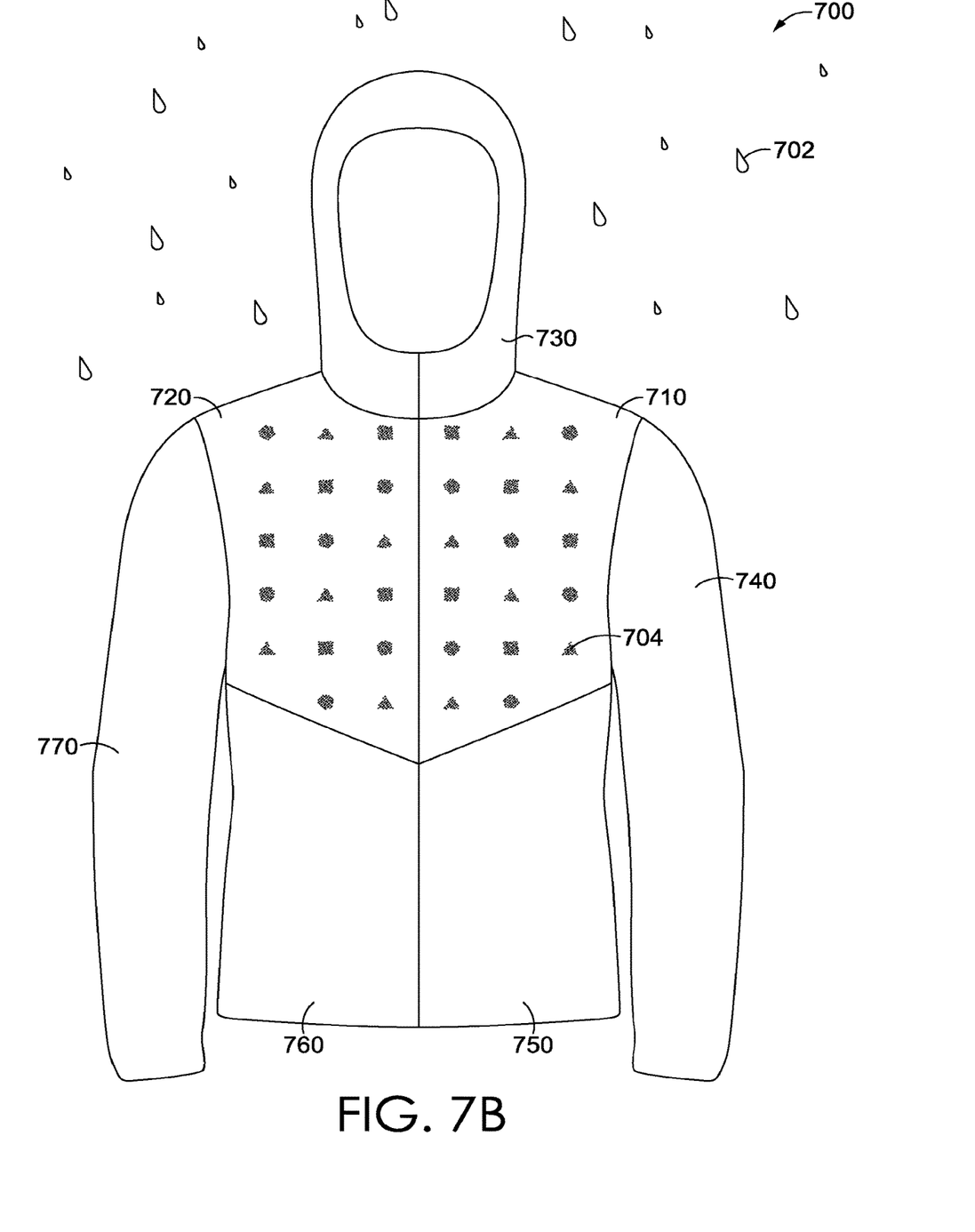
FIG. 7B depicts the article in FIG. 7A under wet conditions in accordance with aspects herein.

FIGS. 7A and 7B depict an exemplary garment 700 under dry conditions and under wet conditions, respectively. As shown in FIG. 7A, the garment 700 may be a hooded upper body garment (as shown), a pair of pants, a skirt, a body suit, a poncho, and the like, configured to protect a wearer from wet conditions. The garment 700 may comprise one or more wetness indicator panels such as, for example, panels 710 and 720, and one or more non-indicator panels such as, for example, panels 730, 740, 750, 760, and 770, that together, form the garment 700. In exemplary aspects, the non-indicator panels 730, 740, 750, 760, and 770 may comprise a full coating of a water-repellant coating material (i.e., no non-coated portions) on at least the outer-facing surface of the garment 700 in order to provide full protection from wetness.

As shown in FIG. 7B, the wetness indicator panels (e.g., panels 710 and 720) may comprise patterns formed by a plurality of non-coated portions 704 as revealed in the presence of moisture 702. For example, panels 710 and 720 may reveal a pattern formed by non-coated portions 704, which may include a random pattern of specific shapes or random shapes, a specific pattern of random shapes or specific shapes, a message, a logo, and the like. Since breathability of the garment 700 may be desirable, the two or three layer construction of the wetness indicator panel of FIGS. 1 and 2 may be desirable. The placement of the wetness indicator panels 710 and 720 may be based on areas of a wearer more likely to be exposed to moisture. For example, the wetness indicator panels 710 and 720 may be positioned at a shoulder, upper chest, hood, and upper back area of the garment 700 since these areas are likely to be the first areas exposed to moisture.

Figure 8:
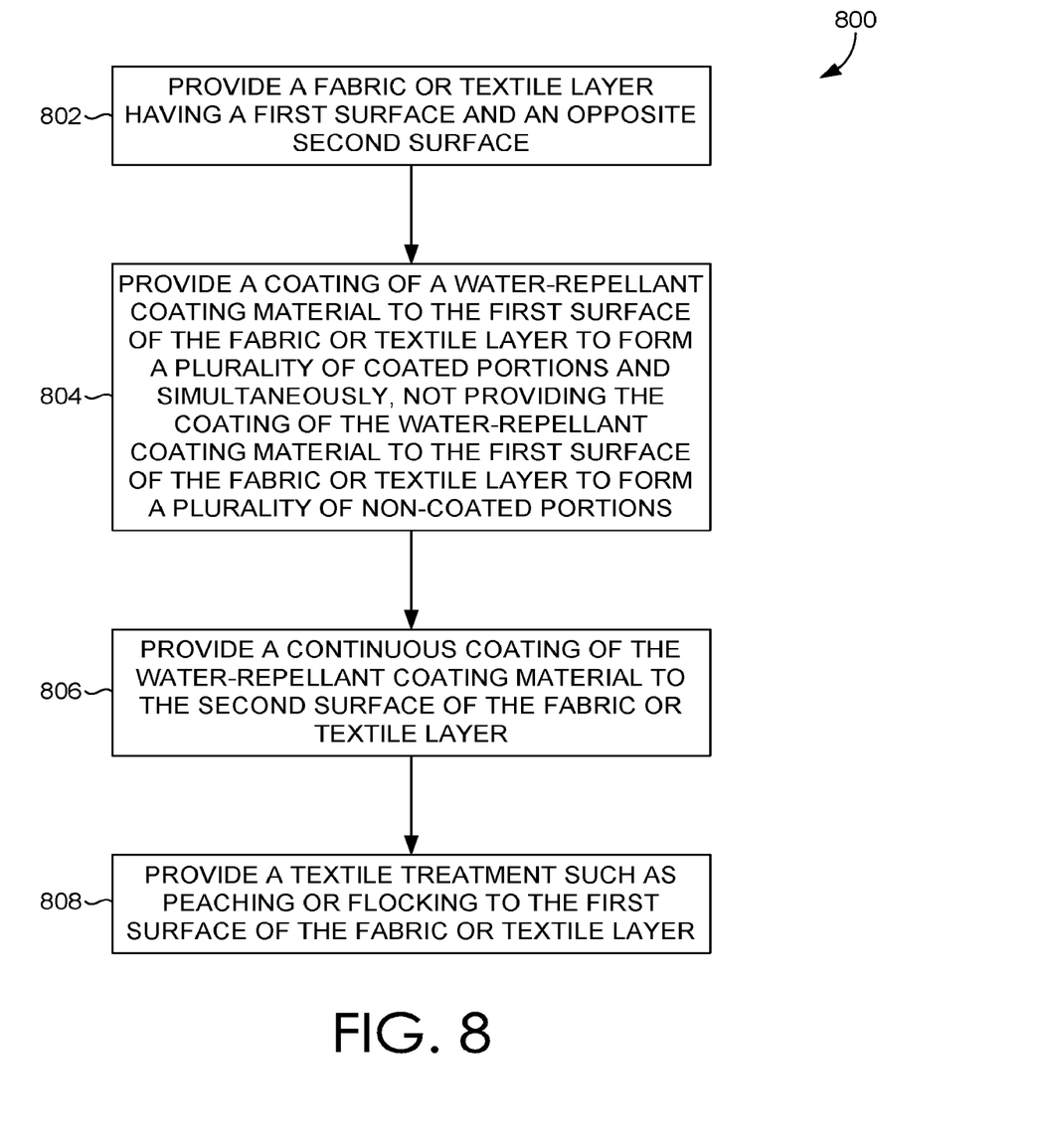
FIG. 8 depicts a method of manufacturing a wetness indicator panel in accordance with aspects herein.

FIG. 8 depicts an outline of a method 800 for manufacturing a wetness indicator panel in accordance with aspects herein. The method 800 includes providing a fabric or textile layer having a first surface and an opposite second surface, as shown at step 802. A coating of a water-repellant coating material may be applied to a first plurality of portions on the first surface of the fabric or textile layer to form a plurality of coated portions and simultaneously not applied to a second plurality of portions on the first surface of the fabric or textile layer to form a plurality of non-coated portions, as shown at step 804. As shown at step 806, the water-repellant coating material is applied to the whole second surface of the fabric or textile layer such that it covers the second surface in its entirety. The application of the water-repellant coating material may be done by any suitable process such as, for example, roller printing, screen printing, and the like. In a final optional step, peaching, flocking, or other type of similar treatment may be further provided to the first surface of the fabric or textile layer in order to minimize direct moisture contact with the first surface of the fabric or textile layer, as shown at step 808.

Figure 9:
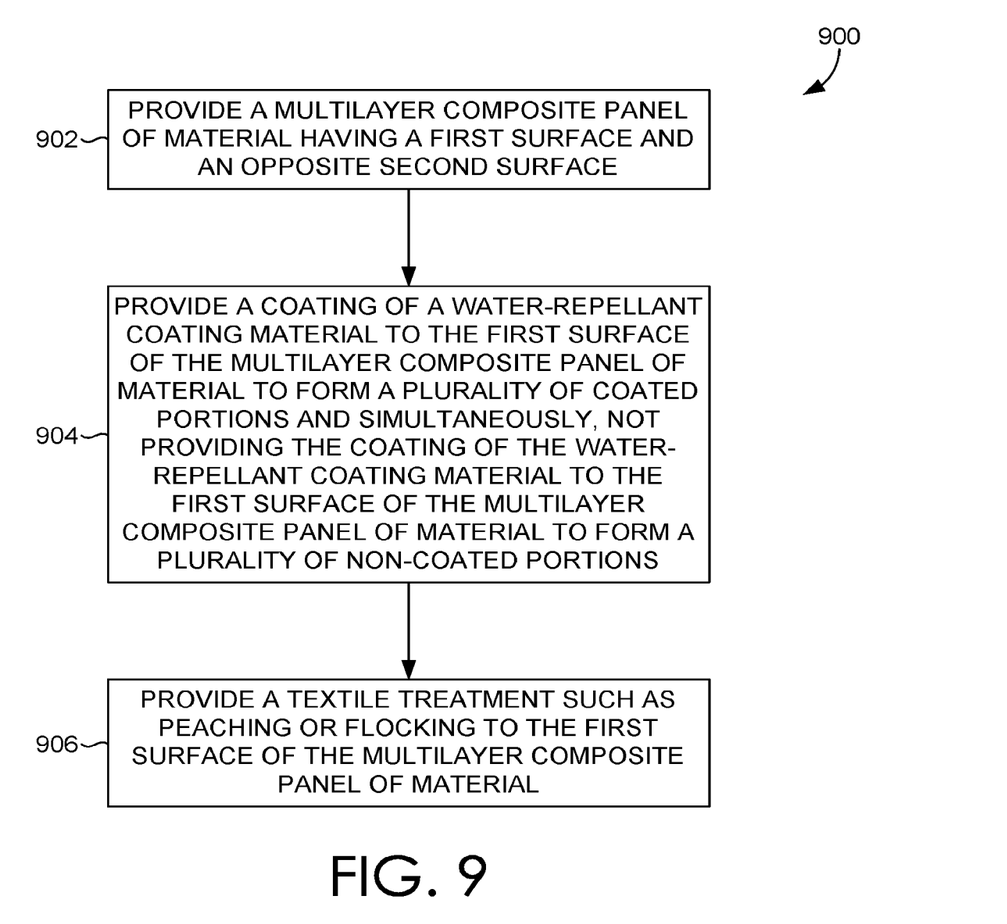
FIG. 9 depicts a method of manufacturing a multilayer wetness indicator panel in accordance with aspects herein.

In an alternative method 900 shown in FIG. 9, where a multilayer wetness indicator panel is being manufactured, a composite panel of material having a first fabric or textile layer, a second breathable and water-resistant membrane layer, and an optional third tricot knit or mesh layer may be provided, as shown at step 902. The method may further include the steps of providing or applying a coating of a water-repellant coating material to a first plurality of portions on the first surface of the multilayer composite panel to form a plurality of coated portions and simultaneously, not applying the water-repellant coating material to a second plurality of portions on the first surface of the multilayer composite panel to form a plurality of non-coated portions, as shown at step 904. As described above, the application of the water-repellant coating material may be done by any suitable process such as, for example, roller printing, screen printing, and the like. In a final optional step, the first layer of the multilayer composite panel may be further provided with a textile treatment such as peaching, flocking, or other type of similar treatment. The optional textile treatment may serve to minimize direct moisture contact with the first surface of the multilayer composite panel, as shown at step 906. The optional textile treatment shown at 906 may be applied to the entire first surface, or alternatively, it may be applied to only the plurality of non-coated portions, or only to the plurality of coated portions. In addition to preventing or reducing the chances of moisture from coming in direct contact with the first surface of the multilayer composite panel, the textile treatment may also add additional visual interest to the first surface of the multilayer composite panel even when it is in its dry state.

The wetness indicator panel resulting from any of steps 806 or 808 in method 800 in FIG. 8 or the multilayer wetness indicator panel resulting from any of steps 904 or 906 of method 900 in FIG. 9, may be used for manufacturing wetness indicator articles and garments in accordance with aspects herein.

It will be understood that certain features and subcombinations are of utility and may be employed without reference to other features and subcombinations. This is contemplated by and is within the scope of the claims.

Since many possible embodiments may be made of the technology described herein without departing from the scope thereof, it is to be understood that all matter herein set forth or shown in the accompanying drawings is to be interpreted as illustrative and not in a limiting sense.

The invention claimed is:

1. A garment comprising:
   an exterior surface;
   an interior surface; and
   a wetness indicator panel having:
      a first layer comprised of a woven material or a knit material having a first surface forming at least a portion of the exterior surface of the garment and an opposite second surface, wherein the first surface comprises a water-repellant coating material forming a pattern of a plurality of water-repellant coated portions and a plurality of non-water repellant coated portion, and wherein a first area collectively occupied by the plurality of water-repellant coated portions is larger than a second area collectively occupied by the plurality of non-water repellant coated portions;
      a second layer comprised of a water resistant and breathable membrane having a third surface and an opposite fourth surface, wherein the opposite second surface of the first layer is bonded to the third surface of the second layer; and
      a third layer comprised of a tricot knit or mesh material having a fifth surface and an opposite sixth surface, the opposite sixth surface forming at least a portion of the interior surface of the garment, wherein the opposite fourth surface of the second layer is bonded to the fifth surface of the third layer.

2. The garment of claim 1, wherein the plurality of non-water repellant coated portions are comprised of discrete shapes.

3. The garment of claim 2, wherein the discrete shapes comprise one or more of a logo, a symbol, a geometric shape, an organic shape, or an alphanumeric character.

4. The garment of claim 1, wherein the pattern is invisible when the wetness indicator panel is dry.

5. The garment of claim 1, wherein each non-water repellant coated portion in the plurality of non-water repellant coated portions is circumscribed by one or more of the plurality of water-repellant coated portions, and wherein the plurality of non-water repellant coated portions are distributed throughout the wetness indicator panel.

6. The garment of claim 1, wherein the pattern becomes visible when the plurality of non-water repellant coated portions are exposed to moisture.

7. The garment of claim 1, wherein the woven material of the first layer comprises a stretch woven construction.

8. The garment of claim 1, wherein the first surface of the first layer comprises a peach finish.

9. The garment of claim 1, wherein the first layer, the second layer, and the third layer are heat bonded to each other.

10. The garment of claim 1, wherein the garment is an upper body garment, and wherein the wetness indicator panel is located in a shoulder area of the garment.

11. The garment of claim 1, further comprising a non-indicator panel.

12. The garment of claim 11, wherein a surface of the non-indicator panel forming the exterior surface of the garment is fully coated with a water-repellant coating material.

13. The garment of claim 11, wherein the wetness indicator panel is located in an area of the garment that is more likely to be exposed to moisture.

14. The garment of claim 11, wherein the garment is an upper body garment having the wetness indicator panel positioned at least at one of a shoulder area, an upper chest area, a hood, and an upper back area.

15. The garment of claim 1, wherein the wetness indicator panel is located in an area of the garment that is more likely to be exposed to moisture.

* * * * *

UNITED STATES PATENT AND TRADEMARK OFFICE
CERTIFICATE OF CORRECTION

| | | |
|---|---|---|
| PATENT NO. | : 12,324,469 B2 | Page 1 of 1 |
| APPLICATION NO. | : 16/156805 | |
| DATED | : June 10, 2025 | |
| INVENTOR(S) | : Payton Rose, Jarrett L. Reynolds and Heidi A. Vaughan | |

It is certified that error appears in the above-identified patent and that said Letters Patent is hereby corrected as shown below:

In the Claims

In Column 11, Claim 1, Line 27, "portion, and" should read -- portions, and --.

Signed and Sealed this
Second Day of September, 2025

Coke Morgan Stewart
*Acting Director of the United States Patent and Trademark Office*